Sept. 2, 1941.  P. J. CHAPPELLE  2,254,565
EMULSIFYING CLARIFIER VITALIZER
Filed Aug. 8, 1938  3 Sheets-Sheet 1
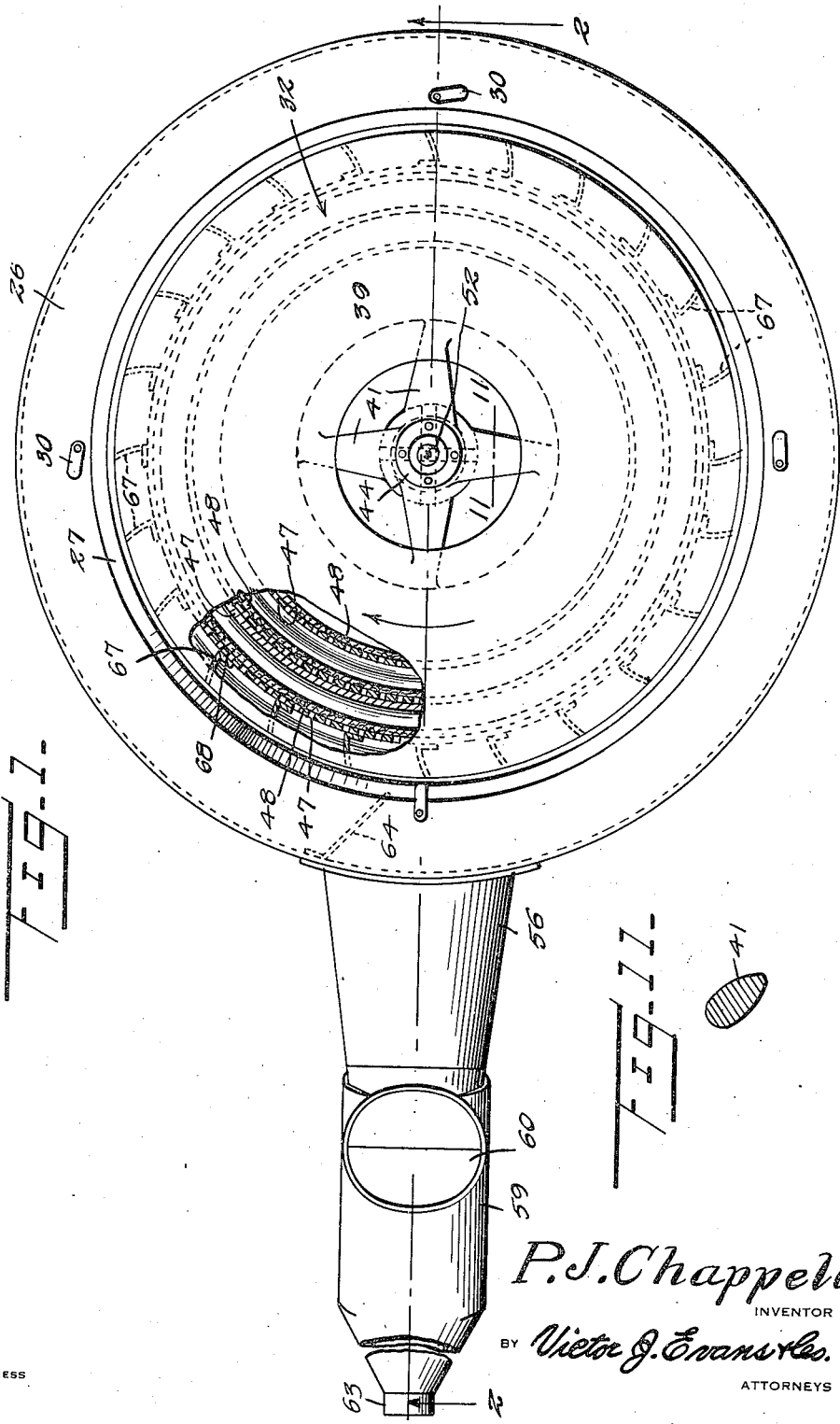
P. J. Chappelle
INVENTOR
BY Victor J. Evans & Co.
ATTORNEYS Sept. 2, 1941.  P. J. CHAPPELLE  2,254,565
EMULSIFYING CLARIFIER VITALIZER
Filed Aug. 8, 1938  3 Sheets-Sheet 2
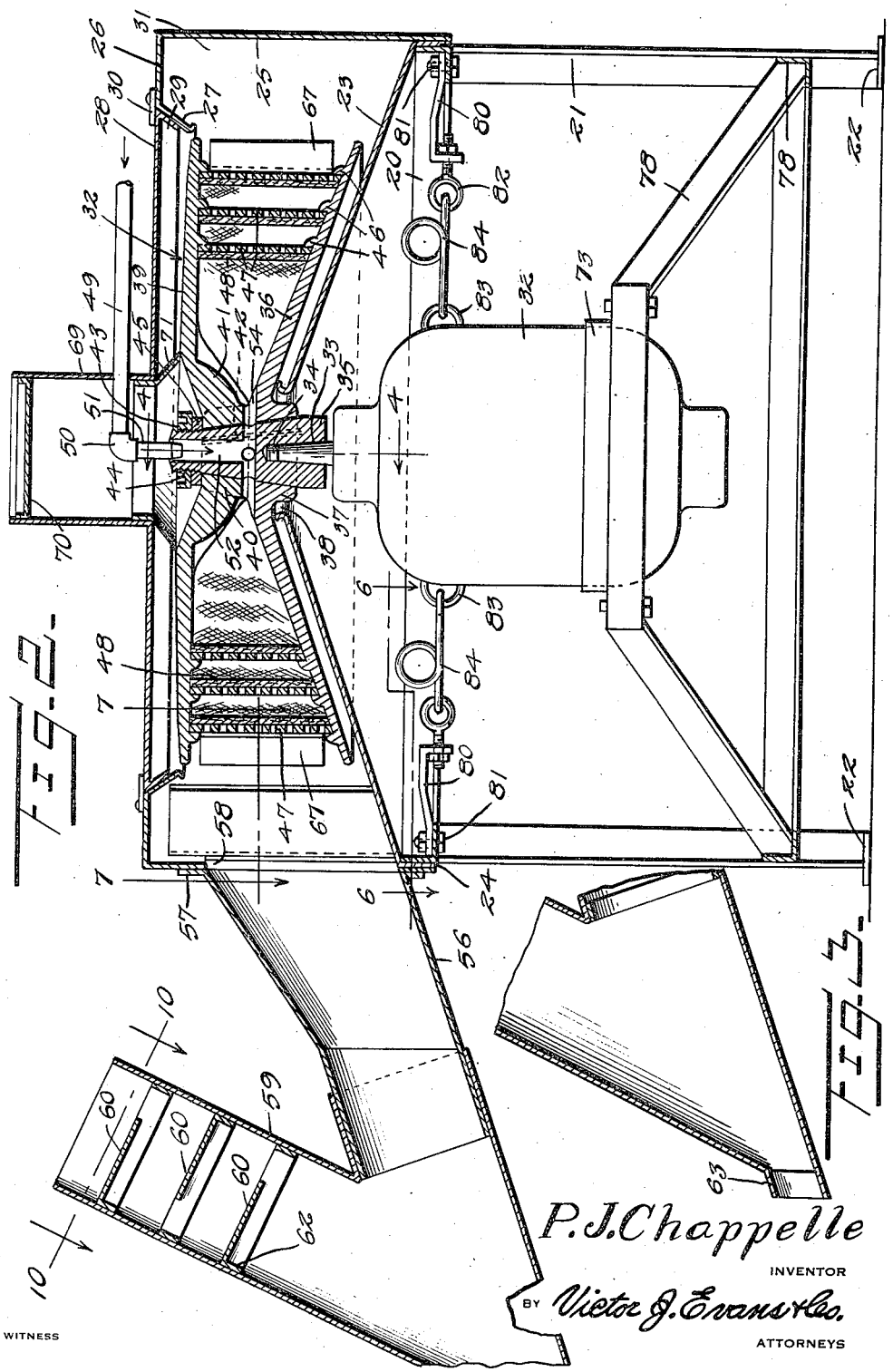
P.J.Chappelle
INVENTOR
BY Victor J. Evans & Co.
ATTORNEYS

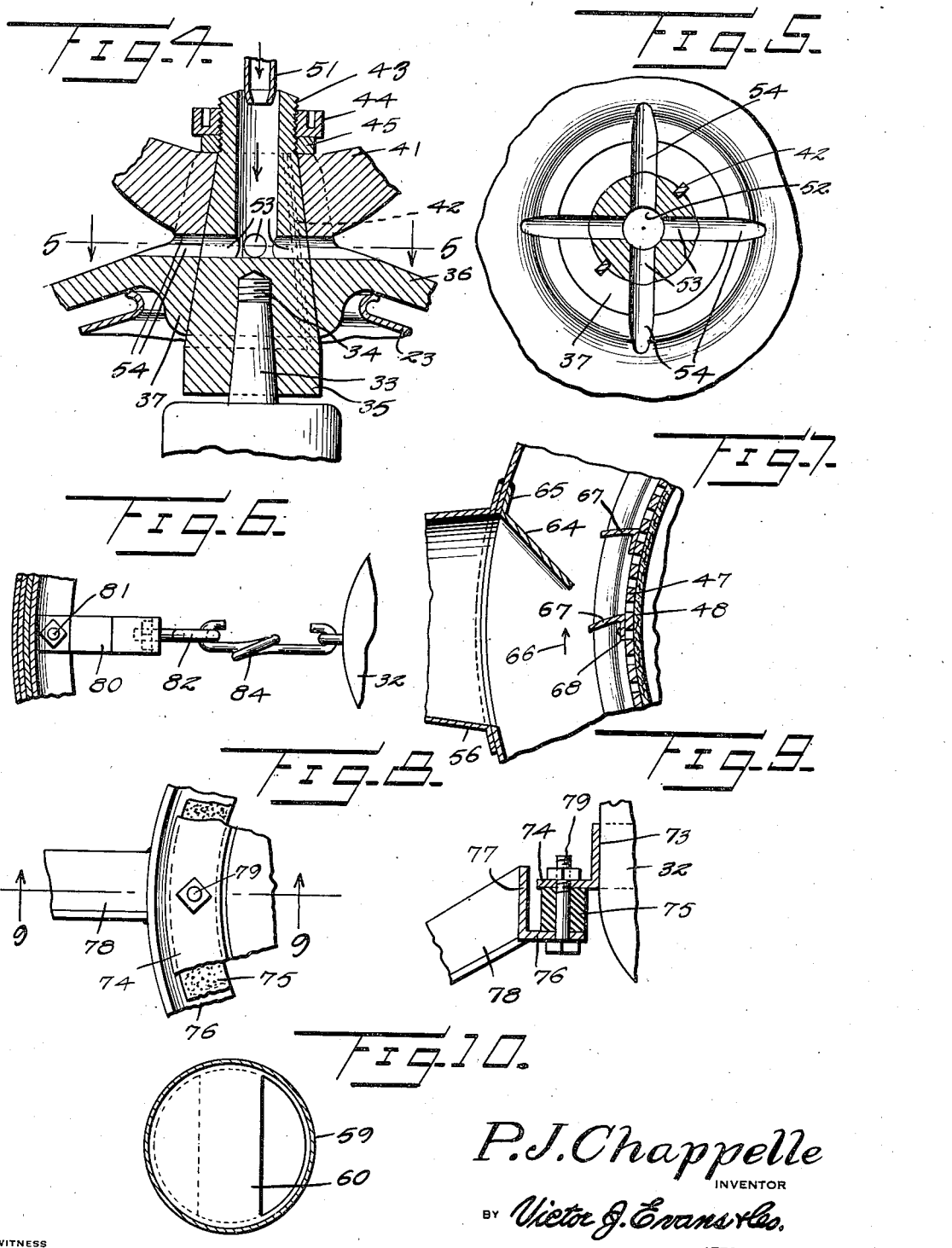

Patented Sept. 2, 1941

2,254,565

UNITED STATES PATENT OFFICE 2,254,565

EMULSIFYING CLARIFIER VITALIZER

Peter J. Chappelle, Butte, Mont.

Application August 8, 1938, Serial No. 223,749

3 Claims. (Cl. 210—66)

My invention relates to the treating of liquids such as milk, water, alcoholic beverages, etc., and includes among its objects and advantages the provision of an improved emulsifier, clarifier and vitalizer.

An object of my invention is to provide a device of the type described embodying rotary filtering means in which the filtering means is characterized by successive stages of progressively increasing filtering properties.

Another object is to provide a device of the type described including a rotary unit made up of nested pockets in which the liquid is delivered centrally of the unit and is caused to pass through the pockets by reason of centrifugal forces and in which the pockets are provided with filtering means for the liquid.

A further object is to provide a device of the type described including a rotary filtering unit in which the liquid is delivered through the unit centrally thereof and is collected by a drain outlet through gravitation.

Other objects and advantages will be apparent from the following description, appended claims and annexed drawings.

Referring to the drawings wherein like reference characters designate like parts throughout the several views:

Figure 1 is a top plan view with certain parts broken away for the sake of clearness.

Figure 2 is a sectional view along the line 2—2 of Figure 1.

Figure 3 is a sectional detail view.

Figure 4 is an enlarged sectional detail view.

Figure 5 is a sectional view along the line 5—5 of Figure 4.

Figure 6 is a detail view taken along the line 6—6 of Figure 2.

Figure 7 is an enlarged detail view along the line 7—7 of Figure 2.

Figure 8 is a plan view of the resilient mount for the motor.

Figure 9 is a sectional view along the line 9—9 of Figure 8.

Figure 10 is a sectional view along the line 10—10 of Figure 2.

In the embodiment selected to illustrate my invention, I make use of a circular supporting ring 20 to which I connect the upper ends of legs 21. The legs may be provided with suitable tabs 22. Supporting ring 20 and the legs 21 preferably comprise angle iron. Tabs 22 may be welded to the legs.

Upon the ring 20 I mount a conically shaped floor or bottom 23. Floor 23 includes a flange 24 which embraces the ring 20. A circular wall 25 embraces the flange 24 and may be welded thereto. Wall 25 terminates in an upper flange 26 which in turn terminates in an angular flange 27 defining a relatively large opening. A cover 28 is provided with an angular flange 29 which has pressure relation with the flange 27 for supporting the cover in place. Pivoted latch elements 30 are provided for latching the cover in place but the cover may be lifted for removal purposes by pivoting the latch element 30 in the clear of the cover.

Floor 23, wall 25, flange 26 and the cover 28 cooperate to provide a chamber 31 which houses the rotary filtering unit 32. Unit 32 is rotated through the medium of a motor 32'. The motor shaft 33 has threaded connection at 34 with a hub 35. Hub 35 tapers upwardly and is fixedly connected with a lower disc 36 having a bored centrally located boss 37 for receiving the hub 35. Disc 36 is conically shaped in the manner of the floor 23 while the latter is provided with a central opening 38' for accommodating the boss 37.

The upper disc 39 includes a central body 40 interconnected therewith through the medium of ribs 41. Body 40 is bored to receive the hub 35 and is keyed thereto by a key 42 which also keys the boss 37 to the hub 35. The upper end of the hub 35 is threaded at 43 for the reception of a nut 44 between which and the body 40 I position a lock washer 45. Body 40 is moved into pressure relation with the boss 37 while these parts are moved into pressure relation with the tapered hub 35 through tightening of the nut 44. It will be thus seen that the discs 36 and 39 are connected as a unit for rotation with the motor shaft 33.

Discs 36 and 39 carry inwardly projecting ribs 46 which serve as abutments or supports for the circular walls 47 which are perforated and arranged in spaced relation as illustrated in Figure 2. Walls 47 are concentrically related as well as concentrically grouped about the axes of the motor shaft 33. Upon the inner face of each wall 47 I mount filtering material 48 which is of progressively decreasing porosity on successive outer walls. Walls 47 are perforated such a degree as to permit liquids to pass easily therethrough but the filters 48 effectively remove solids from the liquids. The walls 47 are clamped between the discs 36 and 39.

The liquid conveying pipe 49 is connected with a source of supply (not shown). An elbow 50 is connected with pipe 49 and carries a short pipe 51 which has its lower end projecting into the bore 52 in the hub 35. The latter is provided with transverse bores 53 which communicate with transverse grooves 54 in the hub 35 and the body 40. It will thus be seen that liquid will flow inwardly of the bore 52 and into the filtering unit 32 through the medium of the transverse bores and grooves 53 and 54, respectively.

A spout 56 is welded at 57 to the wall 25 and is arranged in registration with an opening 58 in the wall. To the end of the spout 56 I connect a recondenser 59 arranged substantially in an upright position and provided with baffle plates 60. The baffle plates are arranged in staggered relation and have flanges 62 welded to the recondenser. The recondenser terminates in a liquid outlet 63.

Inside the chamber 31 and to the wall 25 I connect a deflection vein 64. The vein may be flanged at 65 and welded to the wall. The unit 32 rotates in the direction of the arrow 66. Impeller blades 67 are mounted on the outer ring 47. The impeller blades have flanges 68 welded to the ring. Cover 28 carries a tube 69 constituting an air inlet having communication with the unit 32. I mount an air filter 70 in the tube 69 and the lower end of the tube carries a hood 71 having its lower end terminating in close relation with the disc 39. Ribs 41 are spaced so as to permit the passage of air into the unit 32 after which it passes through the perforated ring 47 and the filtering means associated therewith. The air passes outwardly through the spout 56 and to the atmosphere by way of the recondenser 59. When operating under normal conditions the outlet opening 63 may be substantially filled to capacity so that most of the air circulated through the device will exit through the recondenser 59. Baffle plates 60 function to collect moisture from the air.

To the motor 32' I connect a ring 73 having a flange 74 lying on a rubber cushion 75. Cushion 75 lies on a flange 76 carried by a ring 77. Ring 77 is connected with braces 78 which in turn are supported by a ring 79 welded to the legs 21. The upper ends of the braces 78 may be welded to the ring 77. Bolts 79 pass through the flanges 74 and 76 and the cushion 75 for holding the parts in assembled relation. Ring 73 may be welded to the motor 32'.

Brackets 80 are connected with the ring 24 through the medium of bolts 81. Each bracket 80 carries an eye bolt 82. Loops 83 are anchored to the motor 32' and are interconnected with the eye bolts 82 through the medium of spring elements 84. Eye bolts 82 may be adjusted to secure precise vertical alignment of the motor.

From the foregoing description of the various parts of the device the operation thereof will be readily understood. Unit 32 is rotated through the medium of the motor. Liquid being processed is delivered to the hub 35 and flows into the unit 32 because of centrifugal forces acting thereon. Each ring 47 is perforated for the passage of the liquid and carries a filter 48. Floor 23 inclines downwardly and the spout 56 is located in drainage relation with the floor. Deflection vein 64 facilitates collection of the liquid into the spout 56. Impeller blades 67 move a large volume of air through the unit 32 while the filters 48 effectively remove solids from the liquid.

Cover 28 is easily removed through mere shifting of the latch elements 30. With the cover removed the unit 32 may be removed from the chamber 31 by removing the nut 44. This nut holds the discs 36 and 39 as well as the ring 47 in assembled relation. It will thus be seen that the unit 32 may be easily and quickly disassembled for the purpose of cleaning or substitution of the filtering means. The cushioned mounting for the motor renders the device silent and smooth in operation. To facilitate removal of the cover 28 the pipe 49 may be provided with a flexible coupling at an advantageous point.

The device functions to break up the molecules in milk and other liquids while the filtering means capture all the impurities and solids. Impeller blades 67 cause quick cooling and removal of animal heat from the milk.

I claim:

1. In a device of the type described, a filtering unit comprising a tapered drive hub arranged for rotation about a vertical axis and having an inlet duct extending inwardly of its upper end, a bottom disc bored centrally to fit on the taper of the hub and keyed for rotation therewith, a top disc spaced from the bottom disc and bored centrally to fit the taper of said hub and keyed for rotation therewith, said bottom and top discs each having a centrally located body abutting the same body of the other disc, means having threaded engagement with said hub for pressing the bottom and top discs on the hub, the top and bottom discs having inwardly extending abutments, a plurality of filtering means positioned between the bottom and top discs and lying in engagement with said abutments in concentric relation with the axis of the hub, and at least one of said discs having duct means communicating with said first-mentioned duct for establishing communication between the latter and the space between the bottom and top discs.

2. In a device of the type described, a filtering unit comprising a tapered drive hub arranged for rotation about a vertical axis and having an inlet duct extending inwardly of its upper end, a bottom disc bored centrally to fit on the taper of the hub and keyed for rotation therewith, a top disc spaced from the bottom disc and bored centrally to fit the taper of said hub and keyed for rotation therewith, said bottom and top discs each having a centrally located body abutting the same body of the other disc, means having threaded engagement with said hub for pressing the bottom and top discs on the hub, the top and bottom discs having inwardly extending abutments, a plurality of filtering means positioned between the bottom and top discs and lying in engagement with said abutments in concentric relation with the axis of the hub, at least one of said discs having duct means communicating with said first-mentioned duct for establishing communication between the latter and the space between the bottom and top discs, means for delivering liquid to be filtered into said first duct for passage into the filtering unit, and spokes connecting the central body of said top disc with the top disc and spaced for the inlet of air.

3. In a device of the type described, a filtering unit comprising a tapered drive hub arranged for rotation about a vertical axis and having an inlet duct extending inwardly of its upper end, a bottom disc bored centrally to fit on the taper of the hub and keyed for rotation therewith, a top disc spaced from the bottom disc and bored centrally to fit the taper of said hub and keyed for rotation therewith, said bottom and top discs each having a centrally located body abutting the same body of the other disc, means having threaded engagement with said hub for pressing the bottom and top discs on the hub, the top and bottom discs having inwardly extending abutments, a plurality of filtering means positioned between the bottom and top discs and lying in engagement with said abutments in concentric relation with the axis of the hub, at least one of said discs having duct means communicating with said first-mentioned duct for establishing communication between the latter and the space between the bottom and top discs, a motor for driving said hub, a frame for supporting the motor, said motor being resiliently mounted on a portion of said frame, and adjustable resilient elements connecting the motor with other portions of the frame for balancing the motor in an upright position.

PETER J. CHAPPELLE.